United States Patent [19]
Colton et al.

[11] 3,801,459
[45] Apr. 2, 1974

[54] STEREOSPECIFIC MICROBIOLOGICAL HYDROLYSIS PROCESS

[75] Inventors: Frank B. Colton, Evanston; William J. Marsheck, Lake Zurich; Masateru Miyano, Morton Grove, all of Ill.

[73] Assignee: G. D. Searle & Co., Chicago, Ill.

[22] Filed: Apr. 14, 1972

[21] Appl. No.: 244,293

[52] U.S. Cl................. 195/30, 195/51 R, 260/473, 260/476, 260/514, 260/520
[51] Int. Cl.............................................. C12d 1/02
[58] Field of Search............................ 195/30, 51 R

[56] References Cited
UNITED STATES PATENTS
3,290,226    12/1966    Beal et al.............................. 195/30

*Primary Examiner*—Alvin E. Tenenholtz
*Attorney, Agent, or Firm*—John M. Brown

[57] ABSTRACT

The stereospecific microbiological hydrolysis of racemic 2-substituted-(optionally $\Delta^1$) 3-acyloxy-5-oxocyclopentaneheptanoic acids and their lower alkyl esters with Saccharomyces sp. N.R.R.L. Y-7342 affords the corresponding 3α-hydroxy acids or the corresponding esters. Those compounds are intermediates in the preparation of optically active prostaglandin derivatives which are useful as pharmacological agents.

5 Claims, No Drawings

STEREOSPECIFIC MICROBIOLOGICAL HYDROLYSIS PROCESS

The present invention is concerned with the stereospecific microbiological hydrolysis of substituted 3-acyloxycyclopentaneheptanoic acids and esters. In particular, it is concerned with the stereospecific microbiological hydrolysis of racemic 2-substituted 3-acyloxy-5-oxocyclopentaneheptanoic acids and esters of the formula

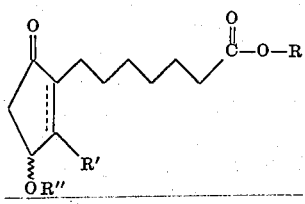

wherein R is a hydrogen or lower alkyl radical, R' is a styryl, formyl, $\alpha,\beta\beta$-dihydroxyphenethyl, 3-hydroxy-1-octenyl or 3-oxo-1-octenyl radical, R'' is an acyl radical containing 1 to 7 carbon atoms and the dotted line represents an optional 1,2-double bond by contacting the above compounds with *Saccharomyces sp.* N.R.R.L. Y-7342, thus forming the 3$\alpha$-hydroxy compounds while leaving the 3$\beta$-acetoxy compounds unreacted.

The lower alkyl radicals represented by the above formula are illustrated by methyl, ethyl, propyl, pentyl, hexyl, heptyl and the branched-chain isomers thereof, the acyl radicals represented contain up to 7 carbon atoms and are illustrated by acetyl, propionyl and isobutyryl and the wavy line represents the racemic mixture of $\alpha$ and $\beta$ isomers.

It has been surprisingly discovered that, when *Saccharomyces sp.* N.R.R.L. (Northern Regional Research Laboratory, 1815 North University Street, Peoria, Ill. 61604 Y-7342 is fermented with racemic 2-substituted-(optionally $\Delta^1$) 3-acyloxy-5-oxo=cyclopentaneheptanoic acids or their lower alkyl esters, hydrolysis selectively occurs to afford the corresponding 1-3$\alpha$-hydroxy acid or ester, while the 3$\beta$-acyloxy isomer remains unreacted. The products of this process may be recovered by usual extraction or chromatographic methods such as those described in the examples.

Starting materials useful for the practice of the instant process are suitably manufactured from styrylglyoxal, conveniently prepared by the selenious acid oxidation of 4-phenyl-3-buten-2-one, and the dialkyl esters of 3-oxoundecane-1,11-dioic acid. Dimethyl 3-oxoundecane-1,11-dioate is thus saponified with potassium hydroxide and the resulting dicarboxylic acid is allowed to react with styrylglyoxal, thus affording dl-14-phenyl-9,12-dioxo-11-hydroxytetradec-13-enoic acid. Cyclization of the latter intermediate in the presence of potassium hydroxide results in dl-3-hydroxy-5-oxo-2-styrylcyclopent-1-eneheptanoic acid.

The 3-hydroxy compounds are acylated to provide the 3-acyloxy derivatives. Typical acylating agents are the acid anhydrides such as acetic anhydride and propionic anhydride. The alkyl esters are prepared by usual methods. For example, dl-3-hydroxy-5-oxo-2-styrylcyclopent-1-eneheptanoic acid is treated with diazomethane to afford the corresponding methyl ester. The methyl ester then is contacted with acetic anhydride to yield dl-methyl 3-acetoxy-5-oxo-2-styrylcyclopent-1-eneheptanoate.

The 2-($\alpha,\beta$-dihydroxyphenethyl)materials are readily obtained by hydroxylation of the corresponding 2-styryl compounds. A convenient reagent is osmium tetroxide. For example, dl-methyl 3-acetoxy-5-oxo-2-styrylcyclopent-1-eneheptanoate is thus contacted at room temperature with osmium tetroxide in dioxane to produce methyl 3-acetoxy-5-oxo-2-($\alpha,\beta$-dihydroxyphenethyl)-cyclopent-1-eneheptanoate.

A convenient procedure for manufacture of the 2-formyl compounds consists of cleaving the glycol structure of the corresponding 2-($\alpha,\beta$-dihydroxyphenethyl) substances. dl-Methyl 3-acetoxy-5-oxo-2-($\alpha,\beta$-dihydroxyphenethyl)cyclopent-1-eneheptanoate in ethanol is contacted with aqueous sodium periodate, thus affording dl-methyl 3-acetoxy-2-formyl-5-oxocyclopent-1-eneheptanoate.

The 2-formyl compounds are alternatively produced from the corresponding 2-styryl derivatives by combining the hydroxylation and cleavage processes. dl-Methyl 3-hydroxy-5-oxo-2-styrylcyclopent-1-eneheptanoate in aqueous dioxane is thus allowed to react with osmium tetroxide and sodium periodate to afford dl-methyl 2-formyl-3-hydroxy-5-oxocyclopent-1-eneheptanoate.

Reduction of the $\Delta^{1,2}$-starting materials used in the instant process provides the corresponding cyclopentaneheptanoic acids and esters. Typical reducing agents are chromous sulfate or zinc metal. As an example of the reduction process, dl-2-formyl-3-acetoxy-5-oxocyclopent-1-eneheptanoic acid, when treated with zinc powder in aqueous acetic acid affords dl-2-formyl-3-acetoxy-5-oxocyclopentaneheptanoic acid.

The compounds produced by the instant process are useful as intermediates in the manufacture of optically active prostanoic acid derivatives of the following structural formula

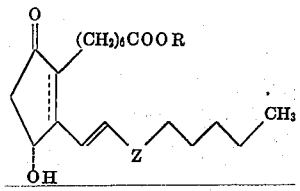

wherein R is hydrogen or a lower alkyl radical, as defined hereinbefore, Z is a carbonyl or hydroxymethylene group and the dotted line indicates an optional 8,12 double bond.

A specific example of the manufacture of one of the latter compounds is the reaction of methyl 3$\alpha$-hydroxy-2-formyl-5-oxocyclopent-1-eneheptanoate with hexanoylmethylene triphenyl phosphorane to afford methyl 11$\alpha$-hydroxy-9,15-dioxoprosta-8(12),13-dienoate. These prostanoic acid derivatives display valuable pharmacological properties. They are thus hypotensive, smooth muscle-contracting, anti-bacterial, anti-protozoal, anti-fungal and pepsin-inhibitory agents.

In the practice of this invention, the substrate may be added to the growing culture or it may be added to the nutrient medium before incubation with the microorganism. The culture medium should contain usable sources of carbon and nitrogen and an adequate sterile air supply. Typically, air can be supplied by exposing a large surface area of the culture medium to air or by passing air through the submerged culture. Suitable nitrogen sources are illustrated by soybean meal, corn steep liquor, mean extracts, peptone, and/or distiller's solubles or other useful organic materials. Synthetics such as nitrates and ammonium compounds may also be used.

Sources of carbon suitable for use in the process of this invention include meat extracts, peptone and similar materials. Additionally suitable compounds are glycerol, glucose, fructose, dextrose, sucrose, lactose, maltose, dextrins, starch and whey. These materials may be used either in purified states or as concentrates such as whey concentrate, corn steep liquor, grain mashes and the like, or as mixtures of the above.

It is often desirable to add an anti-foaming agent to the culture medium. Also, sources of phosphate, magnesium and/or ferrous ions may be incorporated in the culture medium as growth promoting agents. Buffers may also be added to control pH at desired levels.

Process operating conditions may be varied and are not critical. However they should not be so severe as to retard the fermentation or destroy the organism. Typically, concentrations of substrate in the range of 0.01–5.0 percent, temperatures in the range of 25°–35°C. and reaction times of 1–10 days are common but not limiting.

The invention will appear more fully from the examples which follow. However, those examples are not to be considered as limiting the invention either in spirit or in scope as many variations both in materials and methods will be apparent to one skilled in the art. Temperatures are given in degrees Centigrade (°C.) and quantities of material in parts by weight unless otherwise specified.

EXAMPLE 1

A solution containing 100 parts of 4-phenyl-3-buten-2-one, 106 parts of selenous acid, 160 parts of dioxane and 20 parts of water is heated to the reflux temperature. After the initial vigorous reaction has subsided, the mixture is heated at that temperature for an additional 30 minutes. The supernatant is then decanted from the metallic selenium and is concentrated under reduced pressure. Distillation of the residue under reduced pressure affords, as a yellow oil, styrylglyoxal, boiling at about 120° at 2.5 mm. pressure.

EXAMPLE 2

A solution of 38.2 parts of dimethyl 3-oxoundecane-1,11-dioate in 200 parts by volume of 10 percent aqueous potassium hydroxide is stored at 0°–5° for about 3 days, then is adjusted to pH 5 by the addition of concentrated aqueous citric acid. To that mixture is added a solution which is prepared by heating 21.9 parts of styrylglyoxal in 50 parts by volume of 50 percent aqueous methanol at 65°–75° for about 20 minutes, then adding 60 parts of methanol. To the resulting reaction mixture is added 30 parts by volume of 1 M pH 4.5–5.0 citrate buffer and stirring at room temperature is continued for about 3 hours, during which time carbon dioxide gas is evolved. The precipitated product is collected by filtration, thus affording the half potassium salt of dl-14-phenyl-9,12-dioxo-11-hydroxytetradec-13-enoic acid, melting at about 105°. Further purification by recrystallization from methanol affords the pure compound, melting at about 107.5°.

The latter half potassium salt is dissolved in water and the resulting aqueous solution is acidified by the addition of dilute hydrochloric acid. The resulting acidic mixture is extracted with ether and the ether layer is separated, washed with water, dried over anhydrous sodium sulfate and concentrated to dryness. The resulting solid residue is purified by recrystallization from chloroform-ether to yield dl-14-phenyl-9,12-dioxo-11-hydroxytetradec-13-enoic acid, melting at about 81.5°–83°.

EXAMPLE 3

To 3,000 parts by volume of an aqueous solution containing 6.7 parts of potassium hydroxide is added, with stirring at 21°–23° over a period of about 2¼ hours, a solution of 10.4 parts of dl-14-phenyl-9,12-dioxo-11-hydroxytetradec-13-enoic acid in 187 parts of chloroform. After completion of the addition, the reaction mixture is stirred for an additional 2 hours, then is made acidic by adding 10 parts of oxalic acid dihydrate. The acidic mixture is extracted with chloroform and the organic layer is washed with dilute aqueous sodium chloride, then dried over anhydrous sodium sulfate and concentrated to dryness under reduced pressure. The resulting residue is recrystallized first from benzene, then from chloroform-ether to yield dl-3-hydroxy-5-oxo-2-styrylcyclopent-1-eneheptanoic acid, which displays a melting point at about 118°. This compound displays an ultraviolet absorption maximum at about 325 millimicrons with a molecular extinction coefficient of about 36,400.

EXAMPLE 4

A mixture containing 44.3 parts of dl 3-hydroxy-5-oxo-2-styrylcyclopent-1-eneheptanoic acid, 11.3 parts of diazomethane and 700 parts of ether is kept at room temperature for about 5 minutes, at the end of which time acetic acid is added in order to destroy the excess reagent. The resulting mixture is then washed with aqeous sodium bicarbonate, dried over anhydrous sodium sulfate and stripped of solvent by distillation under reduced pressure. The residue is purified by chromatography, first on silica gel followed by elution with 50 percent ethyl acetate in benzene, then by dry chromatography on silica gel containing 8 percent water, also using 50 percent ethyl acetate in benzene, thus affording dl-methyl 3-hydroxy-5-oxo-2-styrylcyclopent-1-eneheptanoate. This compound is characterized by infrared absorption maxima, in chloroform, at about 2.75, 2.87, 5.76, 5.88 and 6.17 microns and by an ultraviolet absorption maximum at about 325 millimicrons with a molecular extinction coefficient of about 25,000.

EXAMPLE 5

A solution containing 0.9 part of dl-methyl 3-hydroxy-5-oxo-2-styrylcyclopent-1-eneheptanoate, 10 parts of pyridine and 2 parts of acetic anhydride is kept at room temperature for about 16 hours, then is poured slowly into water. The resulting aqueous mixture is extracted with ether and the ether layer is separated, washed successively with dilute aqueous sodium bicarbonate and dilute aqueous sodium chloride, then dried over anhydrous sodium sulfate and concentrated to dryness under reduced pressure. The resulting residue is purified either by preparative thin layer chromatography using 20 percent ethyl acetate in benzene on silica gel or by dry chromatography on silica gel containing 8 percent water, also using 20 percent ethyl acetate in benzene. The resulting product, obtained as an oil, is dl-methyl 3-acetoxy-5-oxo-2-styrylcyclopent-1-eneheptanoate. In chloroform, this compound exhibits infrared absorption maxima at about 5.75, 5.86, 6.15 and 8.02 microns. It exhibits also an ultraviolet absorption maximum at about 325 millimicrons with a molecular extinction coefficient of about 32,700.

EXAMPLE 6

To a solution of 1.23 parts of dl methyl 3-acetoxy-5-oxo-2-styrylcyclopent-1-eneheptanoate in 20 parts of dioxane is added a solution of 0.81 part of osmium tetroxide in 3.85 parts of dioxane. The resulting reaction mixture is allowed to stand at room temperature for about 70 hours, at the end of which time the excess reagent is decomposed by the addition of hydrogen sulfide. The resulting solution is filtered through silica gel containing 8 percent of water and the adsorbent is washed with an ethyl acetate-methanol solution. The filtrate is concentrated and purified by dry column chromatography on silica gel containing 8 percent of water, using 50 percent ethyl acetate in benzene, thus affording, as an oil, dl-methyl 3-acetoxy-5-oxo-2-($\alpha,\beta$-dihydroxyphenethyl)cyclopent-1-eneheptanoate. This compound exhibits infrared absorption maxima, in chloroform, at about 2.78 and 5.78 microns and also an ultraviolet absorption maximum at about 234 millimicrons with a molecular extinction coefficient of about 10,900.

EXAMPLE 7

To a solution of 0.2 part of dl-methyl 3-acetoxy-5-oxo-2-($\alpha,\beta$-dihydroxyphenethyl)cyclopent-1-eneheptanoate in 8 parts of ethanol is added a solution of 0.12 part of sodium periodate in 2 parts of water. The resulting reaction mixture is allowed to stand at room temperature for about 45 minutes, then is diluted with water and extracted with ether. The ether layer is separated, washed with water, dried over anhydrous sodium sulfate and concentrated to dryness under reduced pressure. The resulting residue is heated under reduced pressure for about 10 minutes in order to remove benzaldehyde, thus affording the oily product, which is dl-methyl 3-acetoxy-2-formyl-5-oxocyclopent-1-eneheptanoate. It displays infrared absorption maxima, in chloroform, at about 5.78 and 5.92 microns.

EXAMPLE 8

To a suspension of 214 parts of triphenyl methyl phosphonium bromide with 1,400 parts of ether, under nitrogen, is added, at 0°–5°, 190 parts by volume of a hexane solution containing 41.9 parts of n-butyl lithium. The resulting reaction mixture is allowed to warm to room temperature, then is stirred for about 1 hour and cooled to 0°–5°. A solution of 100 parts of n-hexanoyl chloride in 700 parts of ether is added under nitrogen and the resulting mixture is kept at room temperature for about 16 hours. At the end of that reaction period the ether solution is decanted and washed with dilute hydrobromic acid. The acidic washing is then shaken with the precipitate and the resulting solution is extracted with chloroform. The chloroform extract is washed successively with hydrobromic acid and water, dried over anhydrous sodium sulfate, concentrated to a small volume and diluted with hexane. The resulting crystals of starting material are removed by filtration and the filtrate is dissolved in chloroform, then washed successively with 20 percent aqueous potassium hydroxide, water, hydrobromic acid and water, dried over anhydrous sodium sulfate and concentrated to a small volume under reduced pressure. Dilution of the resulting solution with cyclohexane results in precipitation of the crystalline product, which is purified by recrystallization from aqueous ethanol to afford transparent needle-like crsytals of triphenyl 2-oxoheptyl phosphonium bromide, melting at about 195°.

EXAMPLE 9

A solution of 0.19 part of triphenyl 2-oxoheptyl phosphonium bromide in 75 parts of chloroform is shaken with dilute aqueous potassium hydroxide, then washed with dilute aqueous sodium chloride, dried over anhydrous sodium sulfate, concentrated and dried at room temperature under reduced pressure. The resulting residue consisting of 0.16 part of hexanoylmethylene triphenyl phosphorane is combined with 0.13 part of dl-methyl 3-acetoxy-2-formyl-5-oxocyclopent-1-eneheptanoate and dissolved in 13.2 parts of benzene. The resulting reaction mixture is heated at the reflux temperature for about 24 hours, then is cooled and stripped of solvent under reduced pressure. The resulting residue is purified by dry column chromatography on silica gel containing 8 percent of water, using 20 percent ethyl acetate in benzene, to afford dl-methyl 11-acetoxy-9,15-dioxoprosta-8(12), 13-dienoate. This compound exhibits infrared absorption maxima, in chloroform, at about 5.78 and 6.28 microns and an ultraviolet absorption maximum at about 288.5 millimicrons with a molecular extinction coefficient of about 31,300.

EXAMPLE 10

To a solution of 12 parts of dl-11-acetoxy-9,15-dioxoprosta-8(12), 13-dienoic acid in 28 parts of ethanol, cooled to 0°–5°, is added dropwise a solution of 3 parts of triethylamine in 275 parts of water. To that mixture is added dropwise wth cooling and stirring a solution of 0.32 part of sodium borohydride in 32 parts of water. Stirring at approximately 10° is continued for about 25 minutes, at the end of which time the reaction mixture is poured carefully into excess aqueous citric acid. Extraction with ether affords an organic solution, which is washed with water, dried over anhydrous sodium sulfate and concentrated under reduced pressure to afford dl-11-acetoxy-15-hydroxy-9,15-oxoprosta-8(12),13-dienoic acid.

EXAMPLE 11

A solution of 8.27 parts of dl-2-formyl-3-acetoxy-5-oxocyclopent-1eneheptanoic acid in 150 parts by volume of 50 percent aqueous acetic acid is stirred at 0°–5° with 15 parts of zinc powder for about 2 hours. At the end of that time the mixture is filtered and the filtrate is diluted with approximately 200 parts by volume of saturated aqueous sodium chloride. Extraction of that mixture with ether affords an organic solution, which is washed with saturated aqueous sodium chloride, then dried over anhydrous sodium sulfate and stripped of solvent under reduced pressure. The resulting residue is combined with n-hexanoylmethylene triphenyl phosphorane, prepared from 27.2 parts of n-hexanoylmethyl triphenyl phosphonium chloride according to the procedure of Example 9, then is dissolved in a mixture of 100 parts of dioxane and 440 parts of benzene. The resulting mixtute is heated under nitrogen at the reflux temperature for about 5½ hours, then is concentrated to dryness under reduced pressure. The resulting residue is extracted with ether and the ether extract is washed with cold hydrochloric acid, then with cold water and is finally extracted with cold aqueous potassium bicarbonate. The alkaline extract is acidified by the addition of citric acid and that acidic mixture extracted with ether. The ether solution is washed with water, dried over anhydrous sodium sulfate and concentrated to dryness under reduced pressure to afford dl-11-acetoxy-9,15-dioxoprost-13-enoic acid.

EXAMPLE 12

A medium consisting of 5 parts of commercial pancreatic digest of casein, 5 parts of commercial peptic digest of animal tissue, 20 parts of dextrose, and 1,000 parts of distilled water is placed in equal amounts in five 1 liter flasks. The medium is sterilized by heating in an autoclave to 120° at 15 p.s.i. for 20 minutes. To the resulting sterile medium, then cooled to 25°, is added 2 parts of fluid culture of Saccharomyces sp. N.R.R.L. Y–7342. The flasks are placed on a rotary shaker at 170 rpm and 1 inch orbit at 28°, and the microorganism is permitted to grow under these conditions for about 48 hours. After that time a solution of 0.2 part of dl-3-acetoxy-5-oxo-2-styrylcyclopent-1-eneheptanoic acid in 1 part of acetone is added to each flask. The fermentation is continued with heavy aeration at 230 rpm for 68 hours. The culture, now at a pH of 3.2, is extracted with methylene chloride and the solvent is removed under reduced pressure. The crude fermentation product which remains is dissolved in ether and extracted with 5% sodium bicarbonate solution. The bicarbonate extracts are acidified with citric acid, extracted with ether, and the ethereal extract is dried over anhydrous sodium sulfate and concentrated to dryness. Recrystallization from ethyl acetate-benzene yields pure 1-3α-hydroxy-5-oxo-2-styrylcyclopent-1-eneheptanoic acid, melting at about 115°and displaying an optical rotation in methanol of about −16.7°.

The ethereal mother liquors are concentrated, diluted with n-pentane and extracted with 5 percent sodium bicarbonate. Then the bicarbonate extracts are washed with a mixture of n-pentane and methanol in a ratio of 2.5 to 1, respectively. Acidification of the bicarbonate solution with citric acid and extraction with ether, followed by drying of the ethereal extract over anhydrous sodium sulfate and concentration to dryness affords an oily residue, which, when chromatographed on silicic acid and eluted with benzene containing increasing amounts of ethyl acetate, affords 1-3β-acetoxy-5-oxo2-styrylcyclopent-1-eneheptanoic acid. That compound displays an optical rotation in methanol of about −21.1°.

EXAMPLE 13

A medium consisting of 25 parts of commercial pancreatic digest of casein, 25 parts of commercial peptic digest of animal tissue, 100 parts of dextrose, 5 parts of silicone anti-foam emulsion and 5000 parts of distilled water is sterilized in a 7.5 liter stainless steel fermentor by heating in an autoclave to 120°C. with 15 p.s.i. steam for 50 minutes. To the resulting sterile medium, then cooled to 25°, is added 250 parts of a fluid culture of Saccharomyces sp. N.R.R.L. Y–7342. The mixture is agitated mechanically at 200 rpm while introducing sterile air at a rate of about 4,000 parts by volume per minute. The microorganism is permitted to grow under these conditions for about 20 hours at a temperature of about 30°. Then a solution of 1 part of dl-3-acetoxy-5-0xo-2-styrylcyclopent-1-eneheptanoic acid dissolved in 10 parts of acetone is added to the culture and the fermentation is allowed to continue for about 76 hours. The culture, at a pH of about 3.1, then is extracted with methylene chloride and the solvent removed under reduced pressure. The crude fermentation product is dissolved in 500 parts by volume of the upper phase of a mixture obtained by shaking together 1500 parts by volume of benzene, 500 parts by volume of methanol and 200 parts by volume of distilled water and then extracted with the lower phase of that mixture. The lower phase extractions are combined and concentrated to yield, after seeding in ethyl acetate-benzene, 1-3α-hydroxy-5-oxo-2-styrylcyclopent-1-eneheptanoic acid. That product is identical to the product obtained in Example 12.

The mother liquors are then chromatographed on silicic acid and eluted using benzene containing increasing amounts of ethyl acetate to yield successively β-(2-hydroxyethyl)-indole and 1-3β-acetoxy-5-oxo-2-styrylcyclopent-1-eneheptanoic acid.

EXAMPLE 14

A medium consisting of 1,000 parts of commercial pancreatic digest of casein, 200 parts of commercial enzymatic digest of proteins, 200 parts of commercial autolyzed yeast extract, 4000 parts of dextrose, 100 parts of hydrochloric acid, 20 parts of silicone antifoam emulsion and 200,000 parts of tap water is mixed in a stainless steel fermentor and sterilized by the addition of steam under pressure to a temperature of 120° and a final volume of about 250,000 parts by volume. To the resulting sterile medium, when cooled to 28°, is added 2,000 parts of a fluid culture of Saccharomyces sp. N.R.R.L. Y–7342. That mixture is agitated mechanically at 200 rpm while introducing sterile air at a rate of about 50,000 parts by volume per minute and the microorganism is permitted to grow at these conditions for about 25 hours at a temperature of 28°. After this time, a solution of 49 parts of dl-3-acetoxy-5-oxo-2-styrylcyclopent- 1-eneheptanoic acid and 200 parts of acetone is added and the fermentation is allowed to continue for 30 hours. Then the culture, at a pH of 3.8, is extracted with methylene chloride and the solvent is removed under reduced pressure. The crude fermentation product remaining is purified according to the procedure previously described in Example 12 to yield pure 1-3α-hydroxy-5-oxo-2-styryl=cyclopent-1-eneheptanoic acid. That product is identical to the product of Example 12.

EXAMPLE 15

A medium consisting of 1,000 parts of commercial pancreatic digest of casein, 200 parts of commercial enzymatic digest of protein, 200 parts of commercial autolyzed yeast extract, 4000 parts of dextrose, 100 parts of hydrochloric acid, 50 parts of silicone anti-foam emulsion and 200,000 parts of tap water is mixed in a stainless steel fermentor with live steam under pressure to a temperature of 120°and a final volume of about 250,000 parts. To the resulting sterile medium, after cooling to 28°, is added 1000 parts of a fluid culture of Saccharomyces sp. N.R.R.L. Y–7342. The mixture is agitated mechanically at 200 rpm. while introducing sterile air at a rate of 60,000 parts by volume per minute. The microorganism is permitted to grow at these conditions for about 17 hours at a temperature of about 28°. Then a solution of 44 parts of dl-3-acetoxy-5-oxo-2-styrylcyclopent-1-eneheptanoic acid dissolved in 200 parts of acetone is added. The bioconversion is allowed to continue for about 53 hours, after which time the culture is extracted with methylene chloride and the solvent removed under reduced pressure. The crude fermentation product remaining is purified according to the procedure described in Example 12 to yield pure 1-3α-hydroxy-5-oxo-2-styrylcyclopent-1-eneheptanoic acid, which compound is identical to the product of Example 12.

EXAMPLE 16

A mixture of 3.3 parts of (−)-0-methylmandelic acid, 44 parts of benzene, and 9.67 parts of oxalyl chloride is heated at 60°-70° for about 90 minutes. After the solvent is removed under reduced pressure, the remaining residue is dissolved in 26.4 parts of benzene and again concentrated to dryness. The crude (−)-0-methylmandelyl chloride thus obtained is taken up in 17.6 parts of benzene and added to a cold solution of 5.5 parts of 3-hydroxy-5-oxo-2-styrylcyclopent-1-eneheptanoic acid dissolved in 9.82 parts of dry pyridine. That mixture is allowed to stand for about 16 hours at room temperature and then it is poured into a cold solution containing 40 parts of d-tartaric acid in 1350 parts of water. That mixture is extracted with ethyl acetate and the organic extracts are washed with water, dried over anhydrous sodium sulfate and concentrated to dryness. The oily residue which remains is dissolved in benzene and chromatographed on silicic acid. The initial fraction obtained upon elution with 15 percent ethyl acetate-85 percent benzene is recrystallized from benzene-hexane to give colorless crystals of 3β-((−)-0-methylmandeloxy)-5-oxo-2-styrylcyclopent-1-eneheptanoic acid, melting at about 122°-124° and displaying an optical rotation in methanol of about −22.2°. That compound is further characterized, in chloroform, by absorption maxima in the infrared spectrum at about 1750, 1710 and 1630 reciprocal centimeters and an ultraviolet absorption band, in methanol, at about 326 millimicrons with a molecular extinction coefficient of about 36,000. The latter fraction, obtained upon elution with 15 percent ethyl acetate-85 percent benzene, is recrystallized from benzene-hexane to give colorless needles of 3α-((−)-0-methylmandeloxy)-5-oxo-2-styrylcyclopent-1-eneheptanoic acid, melting at about 96°-98° and displaying an optical rotation of about −84.2° in methanol. That compound absorbs in the infrared spectrum, in chloroform, at about 1750, 1710 and 1630 reciprocal centimeters and has an absorption band in the ultraviolet spectrum at about 326 millimicrons with a molecular extinction coefficient of about 35,000 in methanol.

EXAMPLE 17

A medium consisting of 25 parts of commercial digest of casein, 5 parts of commercial soybean peptone, 4 parts of dextrose, 8 parts of sodium chloride, 4 parts of dipotassium phosphate and 1500 parts of distilled water is divided into 5 equal portions and placed in five 1 liter flasks. The medium is sterilized by heating in an autoclave to 120° at 15 p.s.i. for 20 minutes. To the resulting sterile medium, cooled to 25°, then is added 0.5 part of a fluid culture of *Flavobacterium dehydrogenans* A.T.C.C. 13930. The flasks are incubated on a rotary shaker at 26° for about 24 hours, and, after that time, 0.4 part of 3β-((−)-0-methylmandeloxy-5-oxo-2-styrylcyclopent-1-eneheptanoic acid dissolved in 1 part of acetone is added to each flask. The reaction is allowed to continue for 90 hours with vigorous agitation. The culture is adjusted to pH 4 with citric acid and extracted with methylene chloride, then concentrated to dryness under reduced pressure. The crude product is purified by column chromatography on silicic acid using 50 percent ethyl acetate-benzene as eluant. Crystallization of the crude product gives colorless crystals of d-3β-hydroxy-5-oxo-2-styrylcyclopent-1-eneheptanoic acid, melting at about 113°-114°, and displaying an optical rotation in methanol of about +16°.

EXAMPLE 18

A medium consisting of 8 parts of commercial soy protein, 4 parts of commercial enzymatic digest of casein, 8 parts of dextrose, 2 parts of dipotassium phosphate, and 1500 parts of distilled water is divided into 5 equal portions in 1 liter flasks. The medium is sterilized by heating in an autoclave to 120° at 15 p.s.i. for 20 minutes. To the resulting sterile medium, cooled to 25°, is added 1 part of a fluid culture of *Streptomyces hydrogenans* A.T.C.C 19631. Then the flasks are incubated on a rotary shaker at 26° for 6 hours, and 0.3 part of 3α-((−)-0-methylmandeloxy)-5-oxo-2-styrylcyclopent-1-eneheptanoic acid dissolved in 1 part of acetone is added to each flask. The biotransformation is allowed to continue for about 119 hours with vigorous agitation, and after that time, the culture is adjusted to pH 4 with citric acid and extracted with methylene chloride. The crude product is purified by column chromatography on silicic acid using 50 percent ethyl acetate-benzene as eluant to yield pure, colorless 1-3α-hydroxy-5-oxo-2-styrylcyclopent-1-eneheptanoic acid, melting at about 112°-113° and displaying an optical rotation in methanol of about −15.5°.

EXAMPLE 19

When an equivalent quantity of dl-3-acetoxy-2-formyl-5-oxocyclopent-1-eneheptanoic acid is substituted in the procedure of Example 12, there is produced l-2-formyl- 3α-hydroxy-5-oxocyclopent-1-eneheptanoic acid. acid.

EXAMPLE 20

By substituting an equivalent quantity of dl-3-acetoxy-2-(α, β-dihydroxyphenethyl)-5-oxocyclopent-1-eneheptanoic acid in the procedure of Example 12, there is obtained 1-2-(α, β-dihydroxyphenethyl)-3α-hydroxy-5-oxocyclopent-1-eneheptanoic acid.

EXAMPLE 21

Substitution of an equivalent quantity of dl-3-acetoxy-2-(3-hydroxy-1-octenyl)-5-oxocyclopent-1-eneheptanoic acid in the procedure of Example 12 affords 1-3α-hydroxy-2-(3-hydroxy-1-octenyl)-5-oxocyclopent-1-eneheptanoic acid.

EXAMPLE 22

By substituting an equivalent quantity of dl-methyl-3-acetoxy-5-oxo-2-styrylcyclopent-1-eneheptanoate in the procedure of Example 12 and otherwise following the procedure of Example 12, there is produced 1-methyl 3α-hydroxy-5-oxo-2-styrylcyclopent-1-eneheptanoate.

EXAMPLE 23

When an equivalent quantity of dl-3-acetoxy-2-formyl-5-oxocyclopentaneheptanoic acid is treated according to the procedure of Example 12, there is afforded 1-2-formyl-3α-hydroxy-5-oxocyclopentaneheptanoic acid.

EXAMPLE 24

Substitution of an equivalent quantity of dl-3-acetoxy-2-(3-hydroxy-1-octenyl)-5-oxocyclopentaneheptanoic acid in the procedure of Example 12 affords 1-3α-hydroxy-2-(3-hydroxy-1-octenyl)-5-oxocyclopentaneheptanoic acid.

EXAMPLE 25

To a solution of 5 parts of dl-3-hydroxy-5-oxo-2-styrylcyclopent-1-eneheptanoic acid in 49 parts of pyridine is added 23.2 parts of propionic anhydride and the mixture is allowed to stand for 5 days. After that time, the reaction mixture is poured into 400 parts of ice-water. After the excess propionic anhydride is decomposed, 50 parts by volume of concentrated hydrochloric acid is added and the acidified solution is extracted with ether. The ethereal extract is washed with an aqueous 2 percent hydrochloric acid solution, then with an aqueous 1 percent sodium chloride solution until neutral, and dried over anhydrous sodium sulfate. The solvent is removed under reduced pressure to afford an oily product. That crude product is chromatographed on silica gel, elution being with 95:5 chloroform-acetic acid, to yield crystalline dl-3-propionyloxy-5-oxo-2-styrylcyclopent-1-eneheptanoic acid, melting at about 71°–73°. That material is characterized further by an absorption band in the ultraviolet spectrum at about 324 millimicrons with a molecular extinction coefficient of about 33,000, absorption in the infrared spectrum at about 1738, 1709, 1629 and 1377 reciprocal centimeters and absorption maxima in the nuclear magnetic resonance spectrum at 60 megaHertz in deuteriochloroform at δ (ppm) of about 7.05, 6.23, 2.97 and 1.17.

EXAMPLE 26

When an equivalent quantity of isobutyryl anhydride is substituted in the procedure of Example 25, there is obtained dl-3-isobutyryloxy-5-oxo-2-styrylcyclopent-1-eneheptanoic acid. That material melts at about 79°–80° and is further characterized by absorption in the ultraviolet spectrum at about 325 millimicrons with a molecular extinction coefficient of about 33,000, absorption in the infrared spectrum at 1729, 1705, 1624, 1372 and 1150 reciprocal centimeters and absorption maxima in the nuclear magnetic resonance spectrum at 60 megaHertz in deuteriochloroform at δ (ppm) of about 7.04,

EXAMPLE 27

By substituting an equivalent quantity of dl-3-propionyloxy-5-oxo-2-styrylcyclopent-1-eneheptanoic acid in the procedure of Example 12, there is afforded 1-3α-hydroxy-5-oxo-2-styrylcyclopent-1-eneheptanoic acid. That product is identical to the product obtained in Example 12.

EXAMPLE 28

Substitution of an equivalent quantity of dl-3-isobutyryloxy-5-oxo-2-styrylcyclopent-1-eneheptanoic acid in the procedure of Example 12 affords 1-3α-hydroxy-5-oxo-2styrylcyclopent-1-eneheptanoic acid, identical to the product of Example 12.

What is claimed is:

1. The process for the production of a compound of the formula

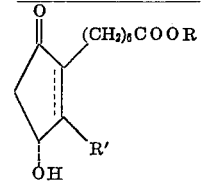

wherein R is hydrogen or a lower alkyl radical, R' is a styryl, α,β-dihydroxyphenethyl, formyl, 3-oxo-1-octenyl or 3-hydroxy-1-octenyl radical and the dotted line represents an optional 1,2 double bond, which comprises fermenting a compound of the formula

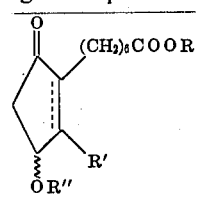

wherein R, R' and the dotted line are as defined above, R'' is an acyl radical containing 1 to 7 carbon atoms and the wavy line represents the racemic mixture, with *Saccharomyces sp.* N.R.R.L. Y–7342.

2. As in claim 1, the process for the production of a compound of the formula

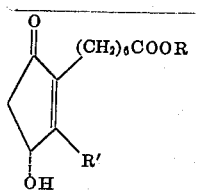

which comprises fermenting a compound of the formula

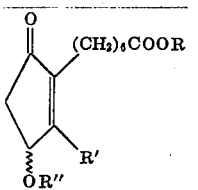

with *Saccharomyces sp.* N.R.R.L. Y–7342 wherein R, R' and R'' are defined as in claim 1.

3. As in claim 1, the process for the production of a compound of the formula

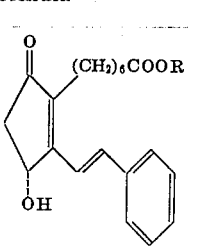

which comprises fermenting a compound of the formula

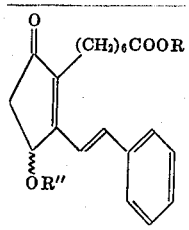

with *Saccharomyces sp.* N.R.R.L. Y-7342 wherein R and R'' are defined as in claim 1.

4. As in claim 1, the process for the production of 1-3α-hydroxy-5-oxo-2-styrylcyclopent-1-eneheptanoic acid which comprises fermenting dl-3-acetoxy-5-oxo-2-styrylcyclopent-1-eneheptanoic acid with *Saccharomyces sp.* N.R.R.L. Y-7342.

5. As in claim 1, the process for the production of 1-3α-hydroxy-5-oxo-2-styrylcyclopent-1-eneheptanoic acid which comprises fermenting dl-3-propionyloxy-5-oxo-2-styrylcyclopent-1-eneheptanoic acid with *Saccharomyces sp.* N.R.R.L. Y-7342.

* * * * *